(12) United States Patent
Massis

(10) Patent No.: US 11,345,104 B2
(45) Date of Patent: May 31, 2022

(54) ASSEMBLY OF MOLDING ELEMENTS

(71) Applicant: COMPAGNIE GENERALE DES ETABLISSEMENTS MICHELIN, Clermont-Ferrand (FR)

(72) Inventor: Frederic Massis, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 0 days.

(21) Appl. No.: 17/057,987

(22) PCT Filed: May 22, 2019

(86) PCT No.: PCT/FR2019/051163
§ 371 (c)(1),
(2) Date: Nov. 23, 2020

(87) PCT Pub. No.: WO2019/224479
PCT Pub. Date: Nov. 28, 2019

(65) Prior Publication Data
US 2021/0206129 A1 Jul. 8, 2021

(30) Foreign Application Priority Data
May 25, 2018 (FR) ...................................... 1854429

(51) Int. Cl.
*B29D 30/06* (2006.01)
(52) U.S. Cl.
CPC .. *B29D 30/0606* (2013.01); *B29D 2030/0613* (2013.01)
(58) Field of Classification Search
CPC ............ B29D 30/0606; B29D 30/0662; B29D 2030/0613
See application file for complete search history.

(56) References Cited

U.S. PATENT DOCUMENTS 2,224,337 A * 12/1940 Bostwick ........... B29D 30/0606
29/515
3,570,571 A * 3/1971 Riches ................. B60C 11/042
152/209.21
(Continued)

FOREIGN PATENT DOCUMENTS

CN 104389869 A * 3/2015
CN 104389869 A 3/2015
(Continued)

OTHER PUBLICATIONS

English translation of CN-104389869-A by EPO. (Year: 2015).*
International Search Report dated Sep. 27, 2019, in corresponding PCT/FR2019/051163 (4 pages).

*Primary Examiner* — Leith S Shafi
*Assistant Examiner* — Inja Song
(74) *Attorney, Agent, or Firm* — Venable LLP

(57) ABSTRACT

An assembly (1) of moulding elements for moulding cuts in a tread of a tire comprises a first sipe blade (2), a second sipe blade (3) and means for assembling the first sipe blade (2) with the second sipe blade (3). The assembly means comprise at least one slot (20) in the thickness of the first sipe blade (2), said first sipe blade (2) having no additional thickness at said slot (20) and a protuberance (30) in the continuation of the second sipe blade (3), said protuberance (30) being able to be inserted into the slot (20). This assembly system is both simple to produce and allows a multitude of configurations of the sipe blades relative to one another.

11 Claims, 4 Drawing Sheets

(56) References Cited

U.S. PATENT DOCUMENTS

| | | | | |
|---|---|---|---|---|
| 5,095,963 A * | 3/1992 | Maitre | ................... | B60C 11/12 |
| | | | | 152/209.18 |
| 6,408,911 B1 * | 6/2002 | Tanabe | ............... | B29D 30/0606 |
| | | | | 152/209.5 |
| 8,449,278 B2 | 5/2013 | Dusseaux et al. | | |
| 10,315,339 B2 * | 6/2019 | Jenkins | ................. | B29C 33/302 |
| 2011/0180191 A1 * | 7/2011 | Christenbury | .......... | B60C 11/12 |
| | | | | 152/209.18 |
| 2011/0304082 A1 | 12/2011 | Dusseaux et al. | | |
| 2018/0162016 A1 | 6/2018 | Reeb et al. | | |
| 2019/0389164 A1 * | 12/2019 | Massis | ............... | B29D 30/0606 |

FOREIGN PATENT DOCUMENTS

| | | | |
|---|---|---|---|
| FR | 2939712 A1 | | 6/2010 |
| FR | 3014734 A1 | | 6/2015 |
| JP | 3-90317 | * | 4/1991 |
| JP | 11-58386 A | | 3/1999 |

\* cited by examiner

ASSEMBLY OF MOLDING ELEMENTS

TECHNICAL FIELD

The present invention relates to an assembly of moulding elements for moulding a cut in a tread of a tyre. Said assembly of moulding elements is intended to form a network of moulding elements in a mould.

PRIOR ART

The document FR2939712 discloses an assembly of moulding elements forming a network. The moulding elements, in this case bars or sipe blades, are produced integrally by laser sintering. These moulding elements make it possible mould cuts in a tread of a tyre.

The network formed by the moulding elements may have a large size. Under certain manufacturing conditions, this network may be subjected to non-negligible deformations, causing it to depart from acceptable manufacturing tolerances. In addition, in order to manufacture such a network, it is necessary to provide a suitable laser sintering machine and more particularly a large plate for receiving the network. This increases the manufacturing costs. Moreover, when a moulding element of the network is non-compliant, the whole network has to be scrapped.

In addition, the document FR3014734 discloses a moulding element that has a means for assembling this moulding element with another moulding element in order to form an assembly of moulding elements. This assembly means consists of a slot made in one or more protuberances in one of the sipe blades, into which the other sipe blade is inserted. The drawback of this solution is that the protuberance creates a void in the tread that is not always desirable. Moreover, the number of possible inclinations is limited.

Therefore, there is a need to find a solution that makes it possible to obtain an assembly of moulding elements with good mechanical integrity, which respects the manufacturing tolerances, which is simple and practical to manufacture, which does not create unnecessary voids in the tread and which allows numerous configurations.

Definitions

A "tyre" means all types of resilient tread, whether or not subject to an internal pressure.

The "tread" of a tyre means a quantity of rubber material delimited by lateral surfaces and by two main surfaces, one of which is intended to come into contact with a road surface when the tyre is being driven on and the other of which is oriented towards the inside of the tyre.

A "cut in a tread" means either a thin cut, also known as a sipe, or a wide cut, also known as a groove.

A "moulding element" means an element disposed in a mould that is able to make cuts in the tread of a tyre. A moulding element that is able to make a sipe in the tread is known as a sipe blade. A moulding element that is able to make a groove in the tread is known as a bar.

SUMMARY OF THE INVENTION

The subject of the invention is an assembly of moulding elements for moulding cuts in a tread of a tyre, said assembly comprising a first sipe blade, a second sipe blade and means for assembling the first sipe blade with the second sipe blade, it is characterized in that the assembly means comprise at least one slot in the thickness of the first sipe blade, said first sipe blade having no additional thickness at said slot and a protuberance in the continuation of the second sipe blade, said protuberance being able to be inserted into the slot. This assembly system is both simple to produce and allows a multitude of configurations of the sipe blades relative to one another. In particular, it does not make it necessary to have a second continuous sipe blade on either side of the first sipe blade.

Advantageously, the second sipe blade makes a non-zero angle $\beta$ with an axis Y, said axis Y belonging to an orthonormal frame of reference of axes X, Y and Z, said axis Y being perpendicular to one of the main lateral faces of the first sipe blade. Each sipe blade has a substantially rectangular surface, bordered by two lateral faces known as the main lateral faces, since they are larger, and two lateral faces known as the secondary lateral faces at the end of the sipe blade.

Advantageously, the angle $\beta$ is between +60° and −60°.

Advantageously, the second sipe blade has a thickness e and the slot has a width l such that $l \geq e + \varepsilon$, with $\varepsilon$ between 0.05 and 2 mm. This makes it possible to keep a clearance in order to make inserting the second sipe blade easier, but also to apply, if needed, an inclination $\beta$ to the second sipe blade.

Advantageously, the slot is inclined by an angle $\alpha$ relative to the axis X, said axis X being perpendicular to one of the main secondary lateral faces of the first sipe blade. This main secondary lateral face corresponds to an upper face or edge face of the sipe blade and extends along the length of this sipe blade.

Advantageously, the angle $\alpha$ is between +30° and −30°.

Advantageously, the main axis of the slot is inclined relative to the axis Y. The two sides of the slot are parallel and inclined by an angle $\beta$. Good holding of the sipe blade with a defined angle is thus achieved.

Advantageously, the slot widens in the direction of the axis Y. The slot has an opening that narrows from the inlet towards the bottom, the second sipe blade enters easily and can then be oriented as desired on one or other of the faces of the slot.

Advantageously, the first sipe blade has a plurality of aligned slots. These slots could be perpendicular or inclined by an angle $\alpha$ relative to the axis X. This makes it possible to hold sipe blades of greater height.

Advantageously, the slot has a height h of between 2 and 10 mm. This dimension is sufficient to guarantee good holding and prevent rotation of the second sipe blade.

Advantageously, the slot is remote from one of the edges of the first sipe blade by a distance d or d1 of between 0.5 and 4 mm. This distance guarantees good strength of the first sipe blade.

Further advantages may also become apparent to a person skilled in the art upon reading the examples below, which are illustrated by the appended figures and given by way of example:

DETAILED DESCRIPTION

Figure 1:
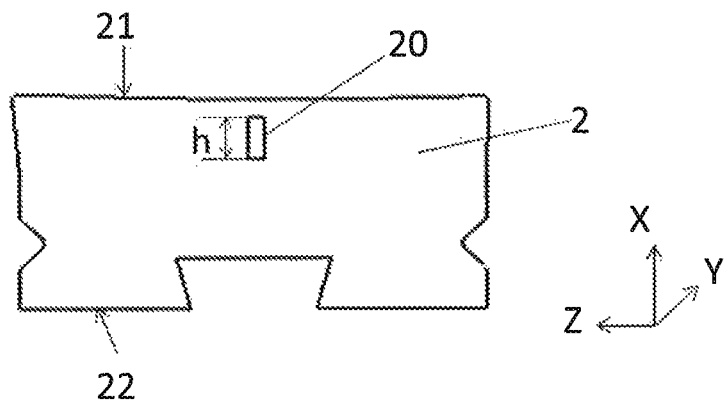
FIG. 1 is a first sipe blade according to the invention.
Figure 2:
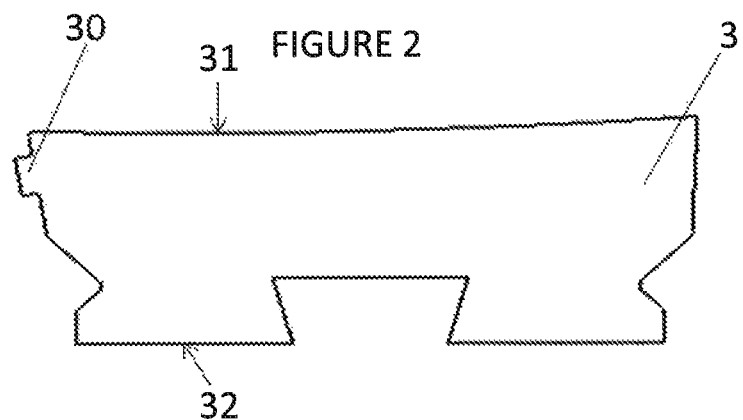
FIG. 2 is a second sipe blade according to the invention.

In the rest of the description, the references are given relative to the orthonormal frame of reference X, Y, Z shown in FIG. 1, the vertical direction corresponding to the axis X, the longitudinal direction to the axis Z and the transverse direction to the axis Y. Similarly, elements which are substantially identical or similar will be denoted by identical references in the various variants.

The assembly 1 of moulding elements for moulding cuts in a tread of a tyre according to the invention comprises a first sipe blade 2 and a second sipe blade 3.

The first sipe blade 2, illustrated in FIG. 1, has a slot 20 of height h, this height will preferably be greater than 2 mm so as to prevent the rotation of the second sipe blade 3, in particular 2.5 mm. This slot 20 is closed at the top and at the bottom. The first sipe blade 2 has an upper edge 21 and a lower edge 22.

Figure 3:
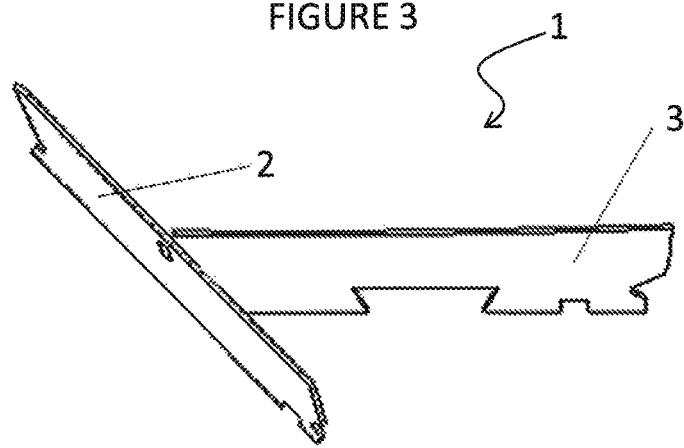
FIG. 3 shows a perspective view of an assembly of two sipe blades according to the invention.
Figure 4:
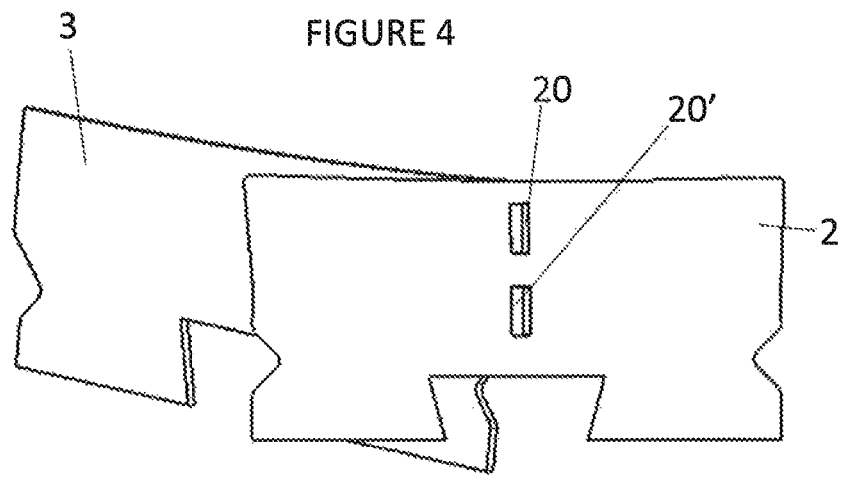
FIG. 4 is a first variant of the assembly according to the invention.

The second sipe blade 3, illustrated in FIG. 3, has a protuberance 30 in the continuation of the sipe blade 3. This protuberance 30 has a length substantially equal to the height h of the slot 20. The second sipe blade 3 has an upper edge 31 and a lower edge 32.

Figures 6A, 6B, 6C:
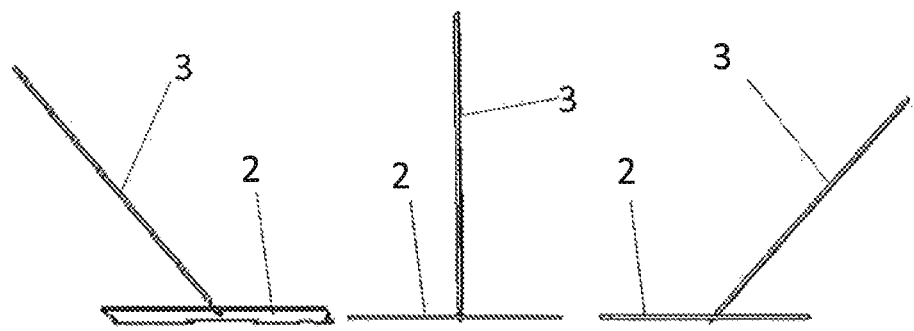
FIGS. 6a, 6b, 6c illustrate the various possible positions of the second sipe blade relative to the first.

FIG. 3 shows the two sipe blades mounted with one another. The second sipe blade 3 has its protuberance 30 inserted into the slot 20 of the first sipe blade 2. In this example, the second sipe blade 3 is inclined relative to the first sipe blade 2. However, as can be seen in FIGS. 6a, 6b and 6c, the second sipe blade 3 may be perpendicular to the first sipe blade 2 (FIG. 6b) or inclined by an angle β towards the left (FIG. 6a) or towards the right (FIG. 6c). This inclination can vary from −60° to +60° relative to the position perpendicular to the first sipe blade 2, i.e. the axis Y.

Figure 5:
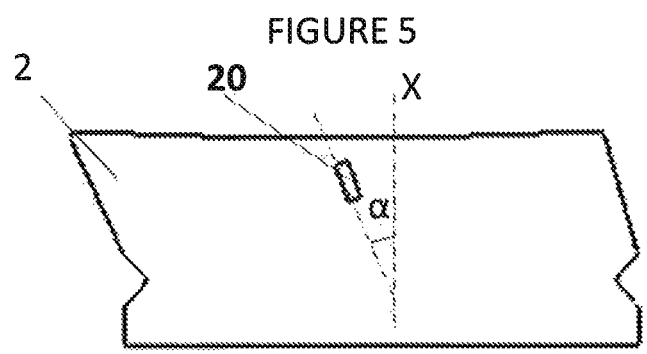
FIG. 5 is a second variant of the assembly according to the invention.

The second sipe blade 3 can also be inclined vertically, i.e. relative to the axis X (cf. FIG. 5). This inclination by an angle α relative to the axis X is between −30° and +30°. It should be noted that the second sipe blade 3 may combine the two inclinations by angles α and β.

If the height of the sipe blades 2 and 3 is large, for example greater than 12 mm, two aligned slots 20 and 20' could be provided so as to ensure better holding, in this case the distance between the two slots 20 and 20' will preferably be 1 mm. The second sipe blade 3 will then have two aligned protuberances 30 in the edge face of said sipe blade and with the same spacing.

It is also possible to provide a plurality of slots 20, which may or may not be parallel, in the first sipe blade 2 so as to insert therein a plurality of blades of the same type as the second sipe blade 3 or so as to leave the user the possibility of choosing the inclination by an angle α.

Figure 7:
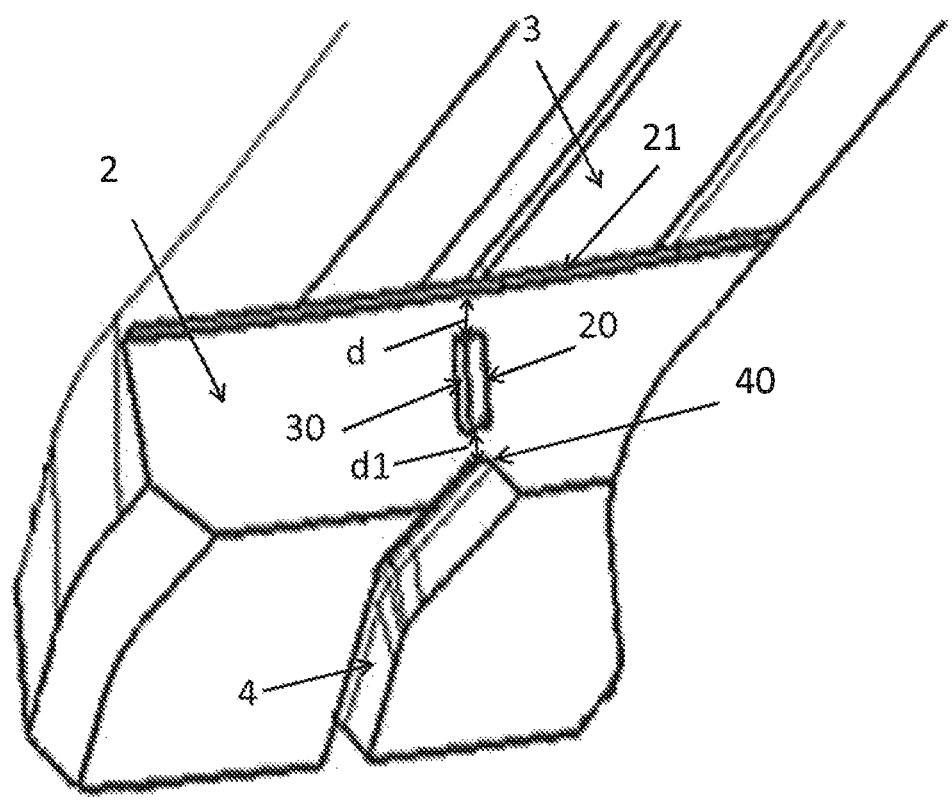
FIG. 7 shows the detail of the mounting of the second sipe blade on the first.

FIG. 7 shows an assembly 1 of moulding elements that is mounted in a mould 4. This mould 4 comprises a plurality of blades of which a bottom part is inserted therein and an upper part protrudes. The boundary between the mould and the bottom part of the sipe blade defines a moulding profile 40. It is important that the top parts of the sipe blades are fastened to one another, this is why the slot 20 of the first sipe blade 2 has to be remote from the upper edge 21 by a minimum distance d and by a minimum distance $d_1$ from the moulding profile 40. The distances d and $d_1$ will preferably be greater than 1 mm. This minimum distance between the slot 20 and the moulding profile 40, and between the slot 20 and the top 21 of the sipe blade 2 guarantees good strength of the sipe blade. The height of the slot 20 has to be preferably at least 2 mm so as to guarantee good holding and prevent rotation of the secondary sipe blade.

Figure 8:
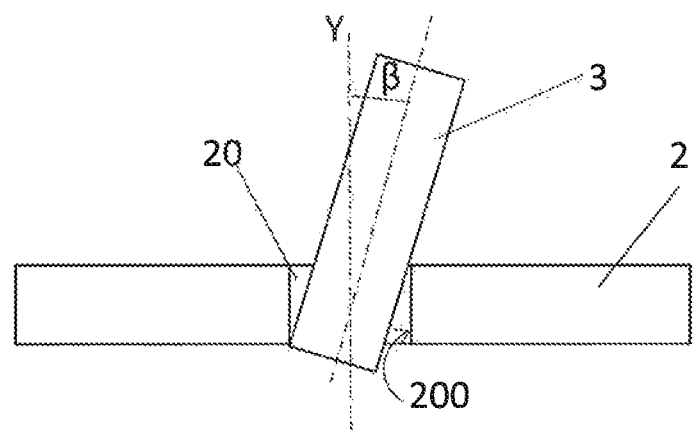
FIG. 8 is a cross section of a first embodiment of the mounting of two sipe blades.

The slot 20 has two parallel sides 200 with axis Y as can be seen in FIG. 8. The slot 20 is thus easy to produce by stamping. It is possible to insert the second sipe blade 3 therein perpendicular to the first sipe blade 2 or with a slight inclination if a certain clearance is left between the second sipe blade 3 and the edges of the slot 20. The width of the slot 20 depends on the thickness of the second sipe blade 3 and the angle β that it is desired to obtain. Thus with a sipe blade 3 with a thickness of 0.4 mm if there is no clearance between the slot 20 and the sipe blade 3, the latter will be inserted perpendicularly, with a clearance of 0.05 to 2 mm, it could be inclined by up to 15°, or even up to 30°.

The protuberance 30 has a width of 0.4 mm minimum to 0.5 or 0.6 mm if there is an angle so as to guarantee good integrity. In the latter case, the protuberance only protrudes behind the slot 20 by a few tenths of a millimeter.

Figure 9:
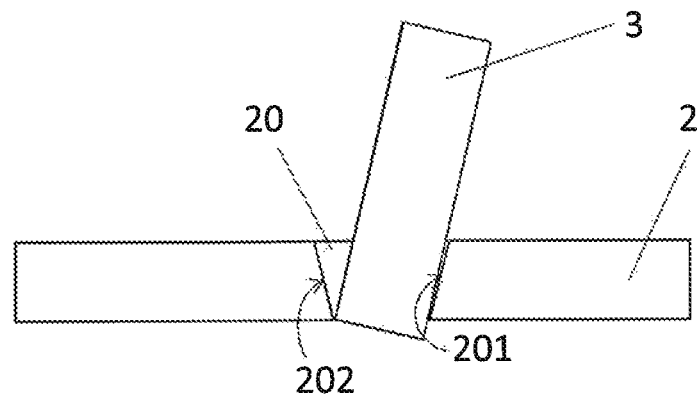
FIG. 9 is a cross section of a second embodiment of the mounting of two sipe blades.

FIG. 9 shows a variant in which the edges 201 and 202 of the slot 20 are flared, the inclination of the edges 201 and 202 makes it possible to give the same inclination to the second sipe blade 3.

Figure 10:
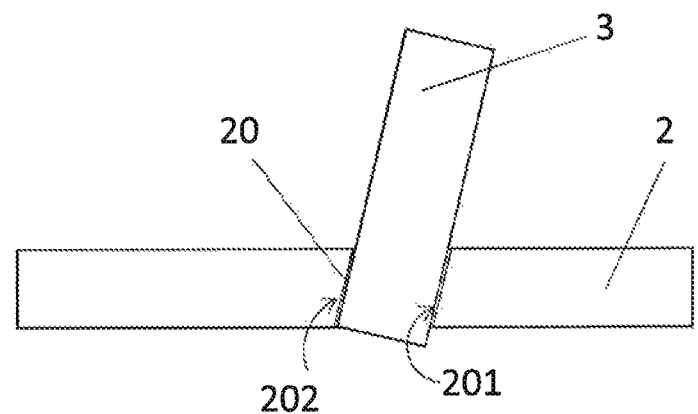
FIG. 10 is a cross section of a third embodiment of the mounting of two sipe blades.

In FIG. 10, the two edges 201 and 202 are parallel and inclined, there is thus both good integrity of the second sipe blade and precise inclination.

The invention claimed is:

1. An assembly of molding elements for molding cuts in a tread of a tire, the assembly comprising:
    a first sipe blade;
    a second sipe blade; and
    means for assembling the first sipe blade with the second sipe blade,
    wherein the assembly means comprise at least one slot in the thickness of the first sipe blade, the first sipe blade having no additional thickness at the slot, and a protuberance in a continuation of the second sipe blade, the protuberance being able to be inserted into the slot.

2. The assembly according to claim 1, wherein the second sipe blade makes a non-zero angle β with an axis Y, the axis Y being perpendicular to a main lateral face of the first sipe blade.

3. The assembly according to claim 2, wherein the angle β is between +60° and −60°.

4. The assembly according to claim 2, wherein the slot is inclined by an angle a relative to an axis X, the axis X being perpendicular to a main secondary lateral face of the first sipe blade, wherein the main secondary lateral face corresponds to an upper face or an edge face of the first ripe blade and extends along first sipe blade.

5. The assembly according to claim 4, wherein the angle α is between +30° and −30°.

6. The assembly according to claim 2, wherein a main axis of the slot through the thickness of the first sipe blade is inclined relative to the axis Y.

7. The assembly according to claim 2, wherein the slot widens in the direction of the axis Y.

8. The assembly according to claim 1, wherein the second sipe blade has a thickness e, and wherein the slot has a width l such that l≥e+ε, with ε between 0.05 and 2 mm.

9. The assembly according to claim 1, wherein the first sipe blade has a plurality of aligned slots.

10. The assembly according to claim 1, wherein the slot has a height h of between 2 and 10 mm.

11. The assembly according to claim 1, wherein the slot is remote from one of the edges of the first ripe blade by a distance of between 0.5 and 4 mm.

\* \* \* \* \*